(12) United States Patent
Alfaro et al.

(10) Patent No.: US 11,258,106 B2
(45) Date of Patent: Feb. 22, 2022

(54) ASYNCHRONOUS MULTI-PURPOSE BATTERY INTERFACE

(71) Applicant: MOTOROLA SOLUTIONS, INC., Chicago, IL (US)

(72) Inventors: Javier Alfaro, Miami, FL (US); Peter J. Bartels, Loxahatchee, FL (US); Hugo Garcia, Miami Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 168 days.

(21) Appl. No.: 16/823,022

(22) Filed: Mar. 18, 2020

(65) Prior Publication Data
US 2021/0296708 A1  Sep. 23, 2021

(51) Int. Cl.
*H01M 10/48* (2006.01)
*H01M 10/42* (2006.01)
*H02J 7/00* (2006.01)

(52) U.S. Cl.
CPC ....... *H01M 10/4257* (2013.01); *H01M 10/48* (2013.01); *H02J 7/0013* (2013.01); *H02J 7/0047* (2013.01); *H01M 2010/4271* (2013.01); *H01M 2010/4278* (2013.01)

(58) Field of Classification Search
CPC ............. H01M 10/4257; H01M 10/48; H01M 2010/4271; H01M 2010/4278; H02J 7/0013; H02J 7/0047
See application file for complete search history.

(56) References Cited

U.S. PATENT DOCUMENTS

| | | | |
|---|---|---|---|
| 5,809,519 A | 9/1998 | Lee | |
| 7,424,312 B2 | 9/2008 | Pinder et al. | |
| 8,909,173 B2 | 12/2014 | Harmke | |
| 9,465,761 B2 | 10/2016 | Decesaris et al. | |
| 2006/0181244 A1* | 8/2006 | Luo | H01M 10/441 320/128 |
| 2019/0067961 A1* | 2/2019 | King | H02J 7/1446 |

* cited by examiner

*Primary Examiner* — Nghia M Doan
(74) *Attorney, Agent, or Firm* — Michael Best & Friedrich LLP

(57) ABSTRACT

A method and apparatus for controlling a battery operating mode. The method includes connecting an electronic processor to a first electrical contact of a battery interface via a switch; generating, with the electronic processor, an initialization pulse for a signal demultiplexer of a battery; transmitting the initialization pulse to the signal demultiplexer; generating, with the electronic processor, a data word indicating a desired operating mode; transmitting the data word to the signal demultiplexer; generating, with the signal demultiplexer, a signal to electrically connect a first battery switch to the first electrical contact, the first battery switch selected based on the data word; receiving, with an analog to digital converter of the electrical device, a signal indicating the operating mode voltage; and verifying, with the electronic processor, a correct operating mode based on the operating mode voltage.

20 Claims, 3 Drawing Sheets

ASYNCHRONOUS MULTI-PURPOSE BATTERY INTERFACE

BACKGROUND OF THE INVENTION

Portable electrical devices often include removable batteries or battery modules that are connected to an electrical device through a number of electrical contacts in a battery interface. To manage an electrical device's size and cost, the number of electrical contacts connecting the device and a removable battery should be limited. At the same time, it is desirable to have or add functionality, such as battery monitoring and communication functionality, to a battery interface. However, battery monitoring, communication, and other functionality generally increases the number of electrical contacts in a battery interface.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
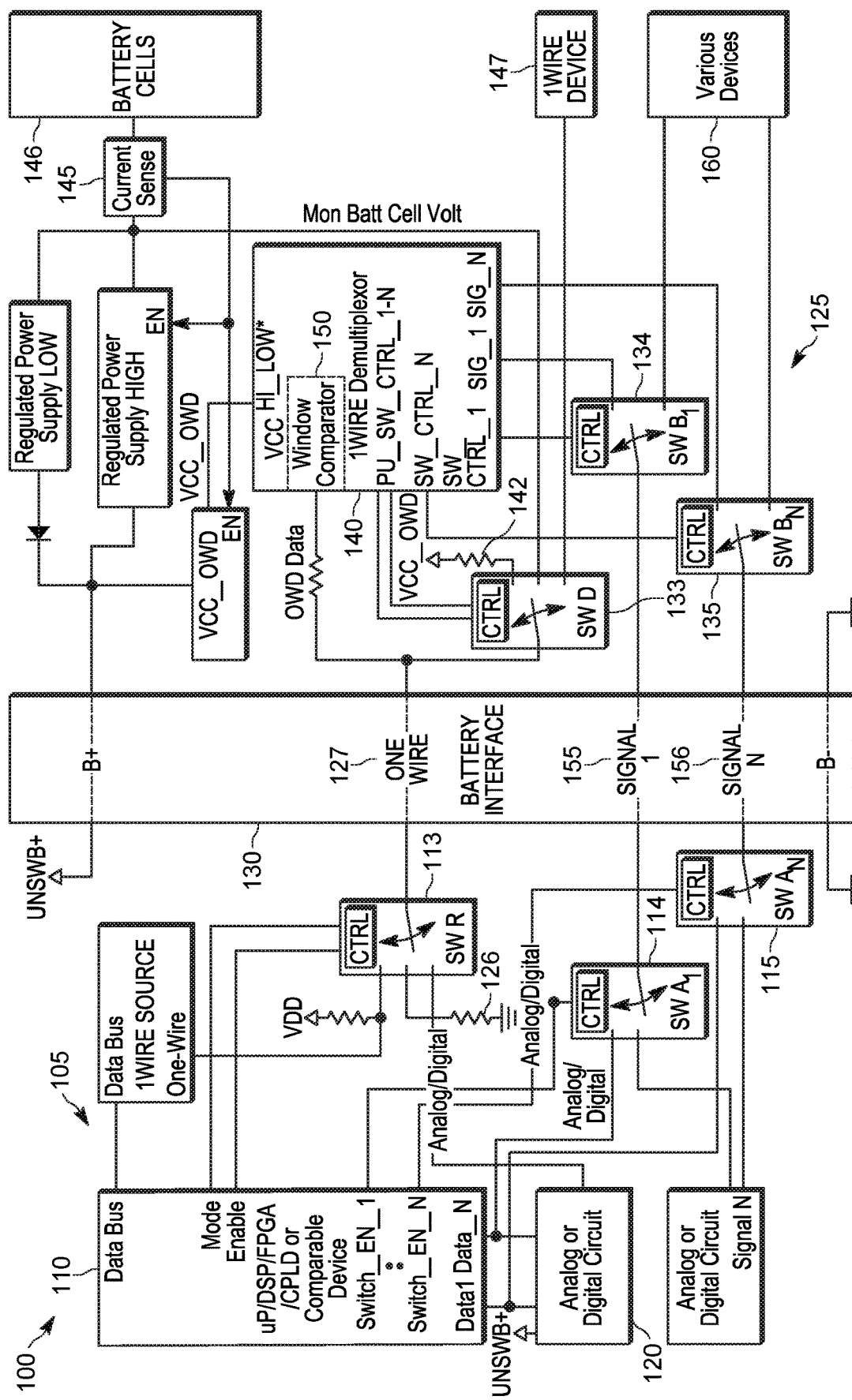
FIG. 1 is a block diagram illustrating an apparatus for controlling a battery operating mode in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Embodiments described and illustrated are directed to, among other things, an apparatus for controlling a battery operating mode. In one example, the apparatus includes an electrical device that includes a plurality of switches and an electronic processor. The electronic processor is configured to generate an initialization pulse, generate an asynchronous data word indicating a desired operating mode, receive an operating mode voltage, and verify a correct operating mode based on the operating mode voltage. The apparatus also includes a battery interface. The battery interface includes a first electrical contact. A first one of the plurality of switches electrically connects the electronic processor to the first electrical contact. The apparatus also includes a battery. The battery includes a plurality of battery switches and a signal demultiplexer electrically connected to the first electrical contact. The signal demultiplexer is configured to receive the initialization pulse, receive the data word, and generate a signal to electrically connect a first battery switch of the plurality of battery switches to the first electrical contact. The first battery switch is selected based on the data word, and an operating mode voltage is transmitted from the first battery switch to the electronic processor via the first electrical contact. The electronic processor uses an analog-to-digital converter to verify that the battery is operating in the correct operating mode based upon the received operating mode.

FIG. 1 illustrates an apparatus 100 for controlling a battery operating mode according to one embodiment. In the example provided, the apparatus 100 includes an electrical device 105. The electrical device 105 may be, for example, a handheld communication device, a portable two-way radio, or other portable electrical device that utilizes a rechargeable, replaceable, or modular battery.

The electrical device 105 includes an electronic processor 110, a first switch 113, a second switch 114, and a third switch 115, which are sometimes referred to as a plurality of switches 113-115, and an analog-to-digital converter ("ADC") 120, which in some embodiments may be replaced by an analog comparator. The electronic processor 110 is configured to control the electrical device 105, the actuation of the plurality of switches 113-115, and the ADC 120. It is to be understood that the plurality of switches 113-115 may include only two switches or may include more than the three illustrated switches.

A battery 125 is connected via a first electrical contact 127 of a battery interface 130 to the electronic processor 110 via the first switch 113. The electronic processor 110 is also configured to generate an initialization pulse and a data word indicating a desired operating mode for the battery 125.

The desired operating mode may be an I2C operating mode, a near-field communication operating mode, a battery cell voltage monitoring operating mode, a one-wire operating mode, or another suitable operating mode. In the I2C mode, the components in the battery 125 communicate with the electronic processor 110 using the inter-integrated circuit protocol. The I2C mode is used to communicate with a co-processor of the battery 125 to handle battery functions such as wireless charging or as a communication protocol. In the near-field communication operating mode, the battery 125 includes an antenna that is used by a near-field communication transmitter/receiver in the electrical device 105 to communicate with external devices. In the battery cell voltage monitoring operating mode, real-time voltage measurements of battery cells are obtained in situations where this data normally would not be available, such as in a situation where the battery 125 is a power-supply battery (for example, a battery where battery cells feed a direct current ("DC") regulator so that a fixed voltage is applied to the electrical device 105 from the battery 125). In the one-wire operating mode, the battery 125 allows the electrical device 105 to communicate with various other devices within the battery 125, such as a fuel gauge integrated circuit or an electrically erasable programmable read-only memory ("EEPROM") integrated circuit storing various battery parameters.

The initialization pulse is generated by the electronic processor 110 using the first switch 113 and a pull-down resistor 126. In most instances, the initialization pulse is a low-voltage signal with a pulse width that is greater than a pulse width of a reset pulse for a current operating mode of the battery 125. The initialization pulse is generated by switching the first switch 113 to the pull-down resistor 126 for the desired pulse width of the initialization pulse and then switching the first switch 113 to connect to the electronic processor 110. The initialization pulse indicates to the battery 125 that a new desired operating mode will be transmitted from the electronic processor 110 and is also used to differentiate between multiple communications protocols on the same first electrical contact 127. The initialization pulse also provides an indication to the battery 125 to wait to receive the desired operating mode as the data word.

In one example, the data word is generated as an n-bit serial word by switching the first switch 113 in between the pull-down resistor 126 and the electronic processor 110 to generate a sequence of high and low voltages (binary 1 and 0 values) that is then transmitted to the battery 125. The data word indicates the desired operating mode to the battery 125. In some embodiments, the data word is generated by the electronic processor 110 asynchronously from the operation of the electrical device 105.

The battery 125 includes a first battery switch 133, a second battery switch 134, and a third battery switch 135, which may be described as a plurality of battery switches 133-135, a signal demultiplexer 140, a pull-up resistor 142, a battery current sensing circuit 145, battery cells 146, and a one-wire device 147. The first battery switch 133 of the plurality of battery switches 133-135 selectively connects the electronic processor 110 via the first electrical contact 127 to the battery current sensing circuit 145, the pull-up resistor 142, or the one-wire device 147 of the battery 125 based upon a control signal from the signal demultiplexer 140, as is described in greater detail below. The signal demultiplexer 140 is also configured to control actuation of the plurality of battery switches 133-135 by generating control signals for each battery switch of the plurality of battery switches 133-135. It is to be understood that the plurality of battery switches 133-135 may include only two switches or may include more than the three illustrated switches. In one embodiment, at least one of the plurality of battery switches 133-135 is an XOR switch.

The battery current sensing circuit 145 detects current drawn from the battery cells 146 so that the signal demultiplexer 140 can determine if the electrical device 105 is in an active state (e.g., drawing current from the battery cells 146). The battery current sensing circuit 145 can also be used by the signal demultiplexer 140 to detect the removal of the battery 125 from the electrical device 105. When the battery 125 is removed, the signal demultiplexer 140 generates a signal to shut down various battery attachments (described below) and also power up in a known state when next attached to the electrical device 105 or another electrical device. The one-wire device 147 is an integrated circuit within the battery 125 performing various functions for the battery 125, such as a fuel gauge integrated circuit or an EEPROM containing various parameters for the battery 125.

In one example, the signal demultiplexer 140 includes a window comparator circuit 150. The window comparator circuit 150 monitors signals from the electronic processor 110 to determine if the initialization pulse is received. When the initialization pulse is received, the signal multiplexer 140 enables the pull-up resistor 142 and the window comparator circuit 150 then waits for the data word signal and provides the data word to the signal demultiplexer 140.

Figure 2:
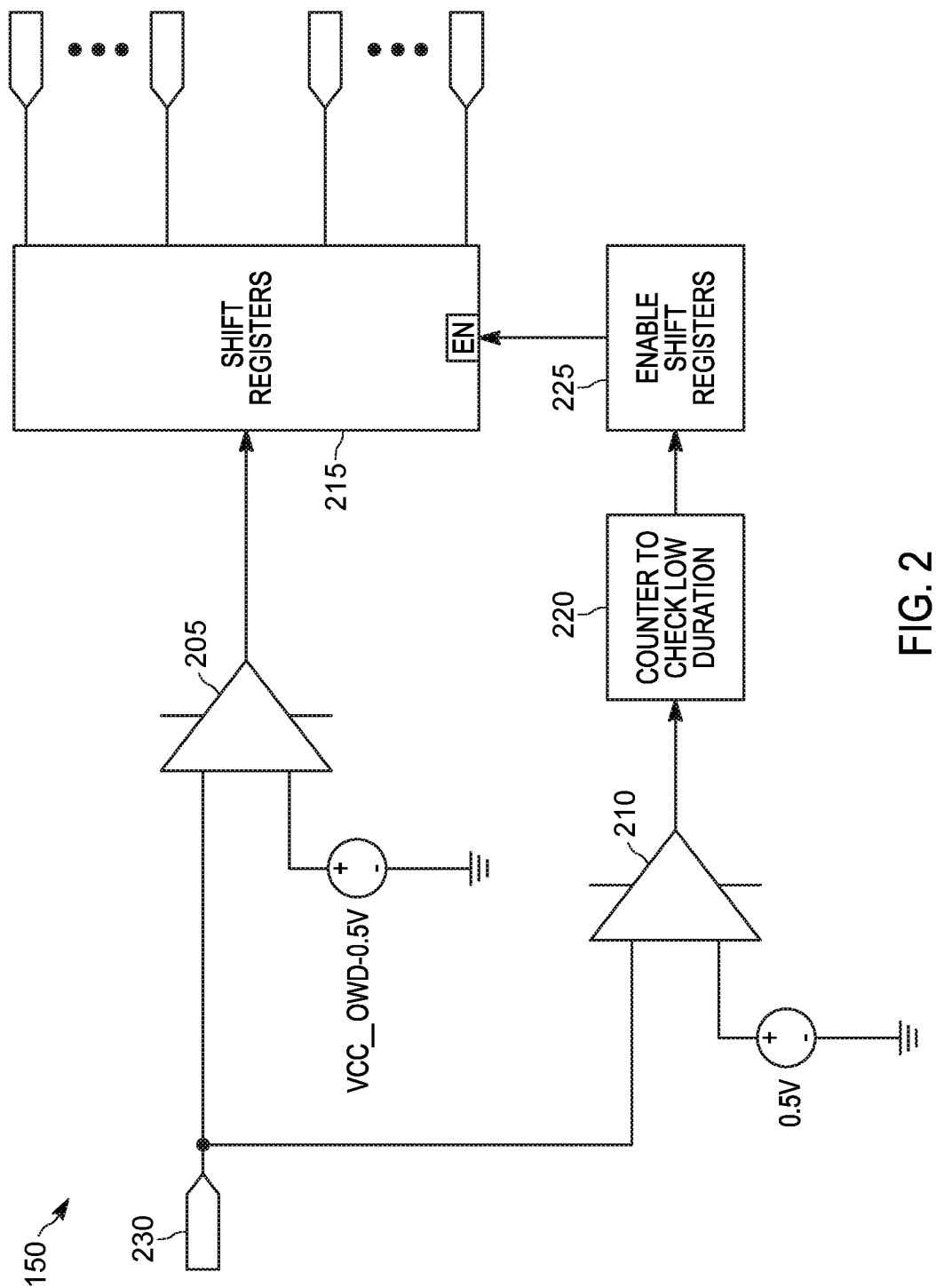
FIG. 2 is a schematic of a window comparator circuit in accordance with some embodiments.

A schematic of the window comparator circuit 150 is illustrated in FIG. 2. In the example illustrated, the window comparator circuit 150 includes a logic-high op-amp 205, a logic-low op-amp 210, shift registers 215, pulse width counter 220, and an enable shift registers circuit 225.

In one example, the window comparator circuit 150 receives a signal 230 via the first battery switch 133. The signal 230 is provided to both the logic-high op-amp 205 and the logic-low op-amp 210.

The logic-high op-amp 205 receives the signal 230 as the inverting input voltage and receives VCC—0.5V as the non-inverting input. The resulting output voltage of the logic-high op-amp 205 is high if the signal 230 is a high-voltage signal and low if the signal 230 is a low-voltage signal.

The logic-low op-amp 210 also receives the signal 230 as the inverting input voltage and receives 0.5 V as the non-inverting input. The resulting output voltage of the logic-low op-amp 210 is low if the signal 230 is a high-voltage signal and high if the signal 230 is a low-voltage signal.

When the initialization pulse, which is a low-voltage signal, is received by the window comparator circuit 150, the logic-high op-amp 205 outputs a low voltage to the shift registers 215. The logic-low op-amp 210 outputs a high voltage to the pulse width counter 220, which counts the duration of the high output voltage from the logic-low op-amp 210. If the duration of the high output voltage is greater than a preset value of a pulse width for the initialization pulse, the pulse width counter 220 outputs a signal to the enable shift registers circuit 225. In response to receiving the signal from the pulse width counter 220, the enable shift registers circuit 225 sends a signal to the shift registers 215 to enable the shift registers 215, which allows the shift registers 215 to receive the data word.

After the shift registers 215 are enabled, the data word is received as the signal 230. The logic-high op-amp 205 provides a signal setting wave form to the shift registers 215. The signal setting wave form represents the data word to be stored in the shift registers 215. Based on the data word stored in the shift registers 215, the signal demultiplexer 140 controls the plurality of battery switches 133-135. For example, if the data word indicates that the battery 125 should be operated in a cell voltage monitoring mode, the signal demultiplexer 140 generates a signal to connect the first battery switch 133 to the battery current sensing circuit 145.

A hardware counter may also provide a counter for a maximum amount of time to receive the data word from electronic processor 110. If the maximum amount of time elapses, the window comparator circuit 150 may stop receiving the signal 230 and operate as if the full data word is received. The maximum amount of time may be dynamically set or a predetermined value.

Returning to FIG. 1, the signal demultiplexer 140 controls the first battery switch 133 to connect the battery current sensing circuit 145 or the one-wire device 147 to the first electrical contact 127 of the battery interface 130 based on the data word.

In some embodiments, the battery interface 130 includes a plurality of electrical contacts 155-156. In some embodiments, the data word stored in the shift registers 220 of the window comparator circuit 150 indicates which of the plurality of battery switches 133-135, such as the second battery switch 134 and the third battery switch 135, should be connected to respective electrical contacts 155-156. These battery switches 134 and 135 connect to various devices 160 of the battery 125 and may communicate using different protocols, such as I2C or near-field communication. In one embodiment, an I2C device of the various devices 160 may be a microprocessor embedded in the battery 125 used for wireless charging. In another embodiment, the various devices 160 includes a Bluetooth module for reporting battery status to a remote location, such as a battery hub. The devices of the various devices 160 that the second battery switch 134 and the third battery switch 135 connect to are indicated by the data word.

Additionally, the electronic processor 110 may be configured to select the second switch 114 and the third switch 115 to connect to respective electrical contacts 155 and 156 based upon the data word to allow the electrical device 105 to communicate with the various devices 160 of the battery 125.

Once the first battery switch 133 is connected to either the battery current sensing circuit 145 or the one-wire device 147, the connection provides an operating mode voltage back to the electrical device 105 via the first battery switch 133, the first electrical contact 127, and the first switch 113.

The ADC 120 receives the operating mode voltage from the first electrical contact 127. The ADC 120 verifies that the received operating mode voltage matches an operating mode voltage for the specified correct operating mode indicated by the data word.

Figure 3:
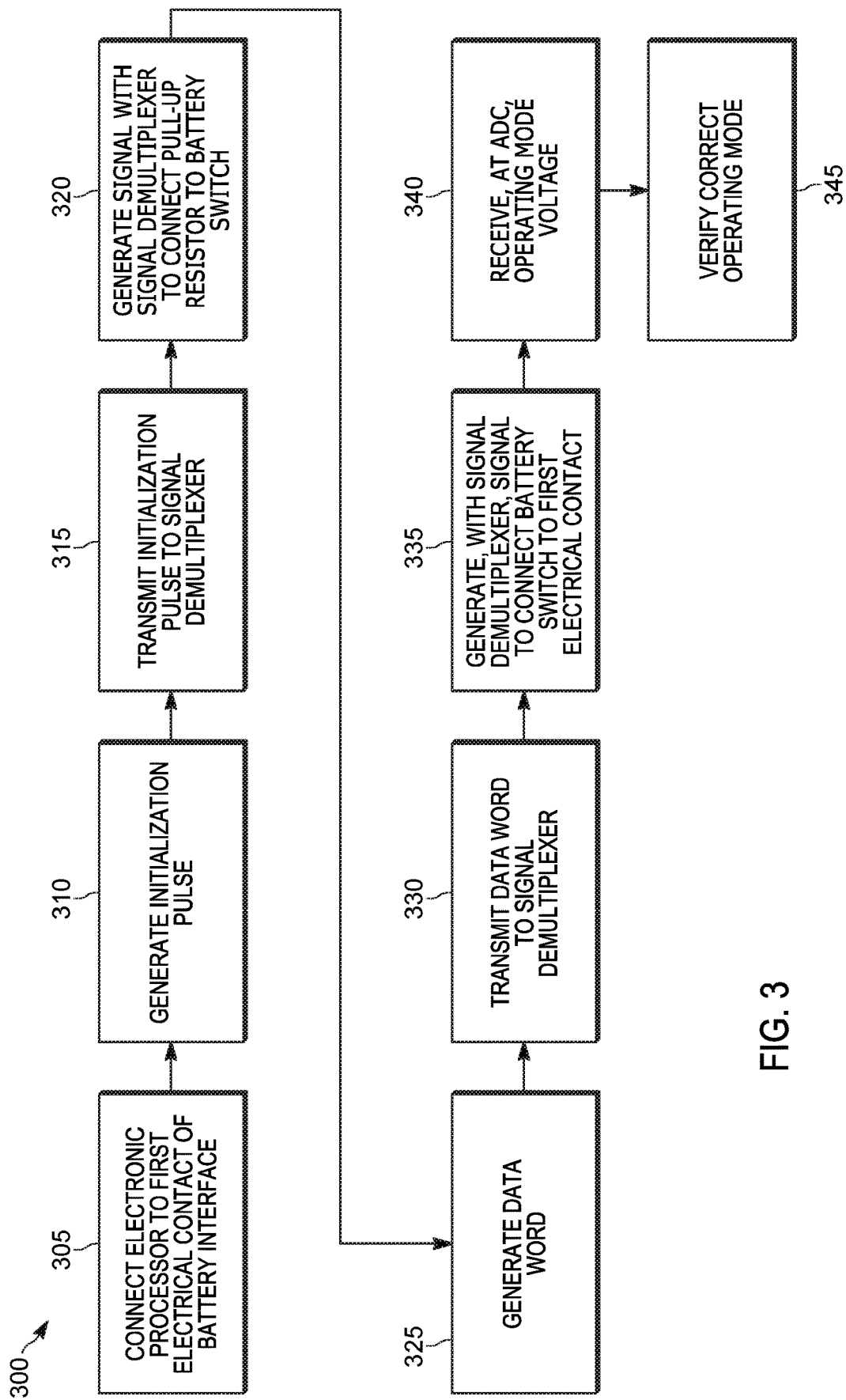
FIG. 3 is a flowchart of a method of controlling a battery operating mode in accordance with some embodiments.

FIG. 3 is a flowchart of a method 300 of controlling a battery operating mode in accordance with some embodiments. In the example illustrated, the method 300 includes connecting the electronic processor 110 to the first electrical contact 127 of the battery interface 130 via the first switch 113 (block 305). The electronic processor 110 then generates the initialization pulse (block 310) and transmits the initialization pulse to the signal demultiplexer 140 (block 315).

The method 300 also includes generating, with the signal demultiplexer 140, a signal to connect the first battery switch 133 to the pull-up resistor 142 (block 320). By connecting the first battery switch 133 to the pull-up resistor 142 after the initialization is received, any incoming data words are not incorrectly sent to any of the one-wire device 147 or other various devices 160. The method 300 also includes generating, with the electronic processor 110, the data word (block 325). The data word is then transmitted by the electronic processor 110 to the signal demultiplexer 140, where the data word is received by the window comparator circuit 150 (block 330). Based on the data word, the signal demultiplexer 140 generates a signal to connect the first battery switch 133 to one of the battery current sensing circuit 145 and the one-wire device 147 and to the first electrical contact 127 (block 335).

The method 300 also includes receiving, with the ADC 120, an operating mode voltage that is dependent on what the first battery switch 133 and/or other battery switches 134 and 135 are connected to (block 340). The ADC 120 verifies that the correct operating mode voltage has been received (block 345) and that the battery 125 is operating in the correct operating mode based on the data word.

Thus, the described invention provides an apparatus for controlling a battery for portable electrical devices. The apparatus helps to manage an electrical device's size and cost by reducing the number of electrical contacts connecting the device and a removable battery while providing full battery monitoring and communication functionality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An apparatus for controlling a battery operating mode, the apparatus comprising
an electrical device, the electrical device including a plurality of switches, an analog-to-digital converter configured to receive an operating mode voltage and an electronic processor, the electronic processor configured to
generate an initialization pulse,
generate a data word indicating a desired operating mode, and
verify a correct operating mode based on the operating mode voltage;
a battery interface, the battery interface including a first electrical contact, a first one of the plurality of switches electrically connecting the electronic processor to the first electrical contact; and
a battery, the battery including a plurality of battery switches and a signal demultiplexer electrically connected to the first electrical contact, the signal demultiplexer configured to
receive the initialization pulse,
receive the data word,
generate a signal to electrically connect a first battery switch of the plurality of battery switches to the first electrical contact for transmitting the operating mode voltage to the analog-to-digital converter of the electrical device, the first battery switch selected based on the data word.

2. The apparatus of claim 1, wherein a pulse width of the initialization pulse is greater than a pulse width of a reset pulse of a current operating mode of the battery.

3. The apparatus of claim 1, wherein the signal demultiplexer generates a signal to connect the first battery switch to a pull-up resistor when the initialization pulse is received.

4. The apparatus of claim 1, the electrical device further comprising a pull-down resistor.

5. The apparatus of claim 4, wherein the electrical device generates the initialization pulse and the data word using the first one of the plurality of switches and the pull-down resistor.

6. The apparatus of claim 1, wherein the electronic processor is further configured to generate a signal to electrically connect a second one of the plurality of switches to a second electrical contact of the battery interface based on the correct operating mode being verified.

7. The apparatus of claim 6, wherein the signal demultiplexer is further configured to generate a signal to electrically connect the second one of the plurality of battery switches to the second electrical contact.

8. The apparatus of claim 7, wherein the second one of the plurality of battery switches is selected based on the data word.

9. The apparatus of claim 1, wherein the battery operating mode is an operating mode selected from the group consisting of an I2C operating mode, a near-field communication operating mode, a battery cell voltage monitoring operating mode, and a one-wire operating mode.

10. The apparatus of claim 1, wherein the data word is received during a specified time window after receiving the initialization pulse.

11. A method for controlling a battery operating mode, the method comprising:
connecting an electronic processor of an electrical device to a first electrical contact of a battery interface via a first one a plurality of switches;
generating, with the electronic processor of the electrical device, an initialization pulse for a signal demultiplexer of a battery;
transmitting the initialization pulse to the signal demultiplexer via the first electrical contact of the battery interface;
generating, with the electronic processor, a data word indicating a desired operating mode of the battery;
transmitting the data word to the signal demultiplexer via the first electrical contact;
generating, with the signal demultiplexer, a signal to electrically connect a first battery switch of a plurality of battery switches to the first electrical contact, the first battery switch selected based on the data word;
receiving, with the signal demultiplexer, a signal indicating an operating mode voltage from the first battery switch;
receiving, with an analog-to-digital converter of the electrical device, a signal indicating the operating mode voltage to the electronic processor via the first electrical contact; and
verifying, with the electronic processor, a correct operating mode based on the operating mode voltage.

12. The method of claim 11, wherein a pulse width of the initialization pulse is greater than a pulse width of a reset pulse of a current operating mode of the battery.

13. The method of claim 11, wherein the signal demultiplexer generates a signal to connect the first battery switch to a pull-up resistor when the initialization pulse is received.

14. The method of claim 11, wherein the electrical device includes a pull-down resistor.

15. The method of claim 14, wherein the electronic processor generates the initialization pulse and the data word using the first one of the plurality of switches and the pull-down resistor.

16. The method of claim 11, further comprising generating, with the electronic processor, a signal to electrically connect a second one of the plurality of switches to a second electrical contact of the battery interface based on the correct operating mode being verified.

17. The method of claim 16, further comprising generating, with the signal demultiplexer, a signal to electrically connect a second battery switch of the plurality of battery switches to the second electrical contact.

18. The method of claim 17, wherein the second battery switch is selected based on the data word.

19. The method of claim 11, wherein the battery operating mode is an operating mode selected from the group consisting of an I2C operating mode, a near-field communication operating mode, a battery cell voltage monitoring operating mode, and a one-wire operating mode.

20. The method of claim 11, wherein the data word is received during a specified time window after receiving the initialization pulse.

* * * * *